(12) United States Patent
Zhang et al.

(10) Patent No.: US 9,431,918 B2
(45) Date of Patent: Aug. 30, 2016

(54) GROUNDING SCHEME FOR MODULAR EMBEDDED MULTILEVEL CONVERTER

(71) Applicant: GENERAL ELECTRIC COMPANY, Schenectady, NY (US)

(72) Inventors: Di Zhang, Niskayuna, NY (US); Luis José Garcés Rivera, Niskayuna, NY (US); Ravisekhar Nadimpalli Raju, Clifton Park, NY (US); Rixin Lai, Clifton Park, NY (US); Andrew Allen Rockhill, Mechanicville, NY (US)

(73) Assignee: General Electric Company, Niskayuna, NY (US)

( * ) Notice: Subject to any disclaimer, the term of this patent is extended or adjusted under 35 U.S.C. 154(b) by 156 days.

(21) Appl. No.: 13/953,153

(22) Filed: Jul. 29, 2013

(65) Prior Publication Data
US 2014/0092660 A1    Apr. 3, 2014

Related U.S. Application Data

(63) Continuation-in-part of application No. 13/629,882, filed on Sep. 28, 2012.

(51) Int. Cl.
*H02M 7/5387* (2007.01)
*H02M 7/217* (2006.01)
(Continued)

(52) U.S. Cl.
CPC .............. *H02M 7/217* (2013.01); *H02M 7/487* (2013.01); *H02M 7/53871* (2013.01); *H02M 7/7575* (2013.01); *H02M 2007/4835* (2013.01); *Y02E 60/60* (2013.01)

(58) Field of Classification Search
CPC .............. H02M 7/527; H02M 7/529; H02M 3/33507; H02M 3/33523; H02M 7/48; H02M 7/521; H02M 7/5387; H02M 7/53871; H02M 7/53875; H02M 3/28; H02M 3/315; H02M 7/515; H02M 7/537; H02M 7/53862; H02M 7/757; H02M 7/79; H02M 3/073; H02M 3/10; H02M 3/135; H02M 3/137; H02M 7/10; H02M 3/3155; H02M 3/325; H02M 7/5383
USPC ...................... 363/95, 98, 97, 124, 131, 132
See application file for complete search history.

(56) References Cited

U.S. PATENT DOCUMENTS 5,644,483 A    7/1997   Peng et al.
5,684,688 A  * 11/1997  Rouaud et al. .............. 363/132
(Continued)

FOREIGN PATENT DOCUMENTS

DE         10103031 A1    7/2002
EP          2713495 A2    4/2014
(Continued)

OTHER PUBLICATIONS

J. Candelaria, "VSC-HVDC System Protection: A Review of Current Methods", 2011 IEEE/PES, Mar. 20-23, 2011, p. 1-7.
(Continued)

*Primary Examiner* — Jeffrey Gblende
(74) *Attorney, Agent, or Firm* — Nitin N. Joshi (57) ABSTRACT

A power converter includes at least one leg with a first string including a plurality of controllable semiconductor switches, a first connecting node, and a second connecting node, wherein the first string is operatively coupled across a first bus and a second bus. The at least one leg also includes a second string operatively coupled to the first string via the first connecting node and the second connecting node, wherein the second string includes a plurality of switching units. The first string includes a first branch and a second branch, wherein the second branch is operatively coupled to the first branch via a third connecting node and the third connecting node is coupled to a ground connection.

20 Claims, 5 Drawing Sheets

(51) Int. Cl.
*H02M 7/757* (2006.01)
*H02M 7/487* (2007.01)
*H02M 7/483* (2007.01)

(56) References Cited

U.S. PATENT DOCUMENTS

| | | | |
|---|---|---|---|
| 6,480,403 B1* | 11/2002 | Bijlenga | 363/98 |
| 7,960,871 B2 | 6/2011 | Dommaschk et al. | |
| 7,969,755 B2 | 6/2011 | Davies et al. | |
| 8,144,488 B2 | 3/2012 | Petersson et al. | |
| 8,144,489 B2 | 3/2012 | Dommaschk et al. | |
| 8,228,693 B2 | 7/2012 | Petersson et al. | |
| 8,233,300 B2 | 7/2012 | Dommaschk et al. | |
| 8,345,457 B2 | 1/2013 | Asplund et al. | |
| 8,410,883 B2 | 4/2013 | Asplund et al. | |
| 2005/0139259 A1 | 6/2005 | Steigerwald et al. | |
| 2006/0044857 A1 | 3/2006 | Lemak | |
| 2006/0056209 A1 | 3/2006 | Blidberg et al. | |
| 2008/0175028 A1 | 7/2008 | Stefanutti et al. | |
| 2008/0198637 A1 | 8/2008 | Meysenc et al. | |
| 2009/0244936 A1 | 10/2009 | Falk et al. | |
| 2009/0262477 A1 | 10/2009 | Dorn | |
| 2009/0295225 A1 | 12/2009 | Asplund et al. | |
| 2011/0013438 A1* | 1/2011 | Frisch et al. | 363/131 |
| 2011/0019453 A1 | 1/2011 | Gonzalez Senosiain et al. | |
| 2011/0096575 A1 | 4/2011 | Asplund et al. | |
| 2011/0115532 A1* | 5/2011 | Roesner et al. | 327/136 |
| 2012/0206948 A1* | 8/2012 | Maldini et al. | 363/97 |

FOREIGN PATENT DOCUMENTS

| | | |
|---|---|---|
| WO | 0231956 A1 | 4/2002 |
| WO | 02063758 A1 | 8/2002 |
| WO | 2004082115 A1 | 9/2004 |
| WO | 2011124258 A1 | 10/2011 |
| WO | 2012055435 A1 | 5/2012 |
| WO | 2013017353 A1 | 2/2013 |
| WO | 2013135277 A1 | 9/2013 |

OTHER PUBLICATIONS

K. Friedrich, "Modern HVDC PLUS application of VSC in Modular Multilevel Converter Topology", 2010 IEEE International Symposium, Jul. 4-7, pp. 3807-3810.

A. Leisnicar et al., An Innovative Modular Multilevel Converter Topology Suitable for a Wide Power Range, IEEE Bologna PowerTech Conference, Jun. 23-26, 2003, pp. 1-6.

N. Ahmed et al. "HVDC SuperGrids with Modular Multilevel Converters—the Power Transmission Backbone of the Future," IEEE 9th International Multi-Conference on Systems, pp. 1-7, 2012.

S. Allebrod et al., "New Transformerless, Scalable Modular Multilevel converters for HVDC-Transmission," IEEE, pp. 174-179, 2008.

Adam et al., "New Flying Capacitor Multilevel Converter", Industrial Electronics (ISIE), IEEE International Symposium, pp. 335-339, Jun. 27, 2011.

European Search Report and Opinion issued in connection with corresponding EP Application No. 13184041.5 on Nov. 26, 2014.

European Search Report and Opinion issued in connection with corresponding EP Application No. 14177807.6 on Jun. 17, 2015.

* cited by examiner

GROUNDING SCHEME FOR MODULAR EMBEDDED MULTILEVEL CONVERTER

CROSS REFERENCE TO RELATED APPLICATIONS

This Application is a continuation-in-part of U.S. patent application Ser. No. 13/629,882, filed Sep. 28, 2012, which application is herein incorporated by reference.

BACKGROUND

Embodiments of invention relates to power converters and more specifically to a multilevel converter.

In the last few decades, the field of power conversion has grown tremendously due to its imminent advantages in motor drives, renewable energy systems, high voltage direct current (HVDC) systems, and the like. The multilevel converter is emerging as a promising power conversion technology for various medium and high voltage applications.

Multilevel converters offer several advantages over an ordinary two-level converter. For example, the power quality of the multilevel converter is better than that of two level converters. Also, the multilevel converters are ideal for interface between a grid and renewable energy sources such as photovoltaics (PV), fuel cells, wind turbines, and the like. In addition, the efficiency of the multilevel converter is relatively higher as a result of its minimum switching frequency.

In the recent times, the multilevel converters having a modular structure and without transformers have been designed. The modular structure of the converters, allows stacking of these converters to an almost unlimited number of levels. Also, the modular structure aids in scaling up to different power and voltage levels. One example of such type of multilevel converters is a modular multilevel converters (MMC) which employees a large number of fully controllable semiconductor switches, such as insulated gate bipolar transistors (IGBTs).

Grounding is an important aspect of multilevel converters. A ground point or earth point refers to a node in the multilevel converter from which various node voltages are measured. Generally, the ground point determines voltage insulation ratings of various components in multilevel converter. Furthermore, the voltage insulation ratings are determined based on maximum voltage respect to search ground a particular component may observe during normal conditions and faults.

BRIEF DESCRIPTION

In accordance with an embodiment of the present technique, a power converter including at least one leg is provided. The at least one leg includes a first string comprising a plurality of controllable semiconductor switches, a first connecting node, and a second connecting node, wherein the first string is operatively coupled across a first bus and a second bus. The at least one leg further includes a second string operatively coupled to the first string via the first connecting node and the second connecting node, wherein the second string includes a plurality of switching units. Furthermore, the first string includes a first branch and a second branch, wherein the second branch is operatively coupled to the first branch via a third connecting node and the third connecting node is coupled to a ground connection.

In accordance with another embodiment of the present technique, a system for power conversion is provided. The system includes a power source, a load and a first power converter. The first power converter includes one or more legs, wherein each of the one or more legs includes a first string comprising a plurality of controllable semiconductor switches, a first connecting node, and a second connecting node, wherein the first string is operatively coupled across a first bus and a second bus. A second string is operatively coupled to the first string via the first connecting node and the second connecting node, wherein the second string comprises a plurality of switching units. Furthermore, the first string comprises a first branch and a second branch, and the second branch is operatively coupled to the first branch via a third connecting node; the third connecting node being coupled to a ground connection. The first power converter further includes a controller configured to control switching of the plurality of controllable semiconductor switches and the plurality of switching units.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

As will be described in detail hereinafter, various embodiments of an exemplary system for power conversion and method for power conversion are presented. By employing the power converter and the method for power conversion described hereinafter, a multilevel converter with a grounding scheme is provided. In one example, the power converter may include a modular multilevel embedded converter. The term multilevel converter, as used herein, is used to refer to a converter that converts one form of input voltage/current to another form of output voltage/current with very low distortion.

Figure 1:
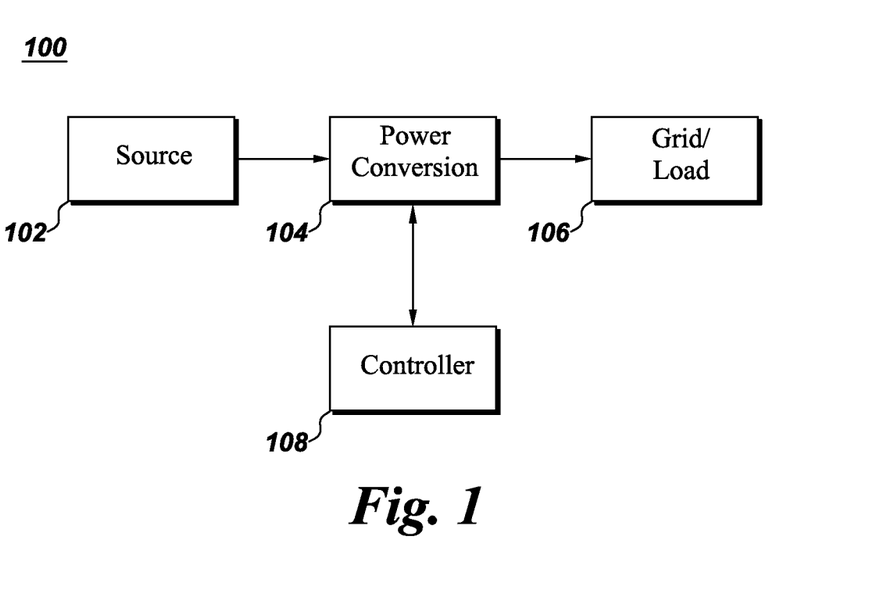
FIG. 1 is a diagrammatical representation of a system for power conversion.

Turning now to the drawings, by way of example in FIG. 1, a system 100 for converting power is depicted. In one embodiment, the system 100 for converting power may include a source 102, a power converter 104, and a grid/utility/load 106. The term source, as used herein, is used to refer to a renewable power source, a non-renewable power source, a generator, a grid, and the like. Also, the term load, as used herein, may be used to refer to a grid, an electrical appliance, and the like. In addition, the power converter 104 may be a multilevel converter. In one embodiment, the source 102 may be operatively coupled to a first terminal (not shown) of the power converter 104. A second terminal (not shown) of the power converter 104 may be operatively coupled to the load 106. The first terminal and the second terminal may be alternatively employed as an input terminal or an output terminal of the power converter 104.

Also, the system 100 may include a controller 108. The controller 108 may be configured to control the operation of the power converter 104, in one embodiment. By way of example, the controller 108 may be configured to control the operation of the power converter 104 by controlling switching of a plurality of semiconductor switches of the power converter 104. Furthermore, in one embodiment, the system 100 may also include other circuit components (not shown) such as, but not limited to, a circuit breaker, an inductor, a compensator, a capacitor, a rectifier, a reactor, a filter, and the like.

Figure 2:
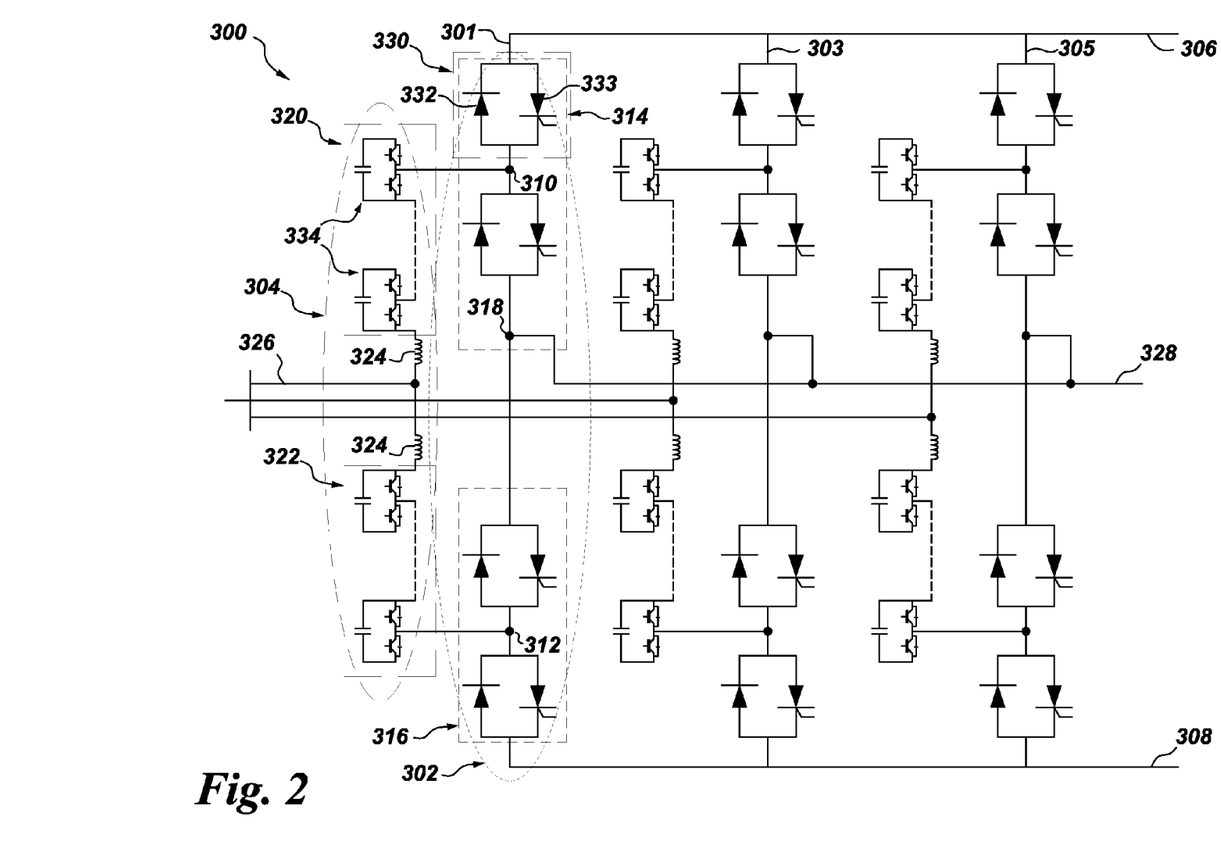
FIG. 2 is a diagrammatical representation of an exemplary embodiment of a modular embedded multilevel converter (MEMC) for use in the system of FIG. 1, according to aspects of the present disclosure.

Referring now to FIG. 2, a diagrammatical representation of an exemplary embodiment of a modular embedded multilevel converter (MEMC) 300 for use in the system of FIG. 1 according to aspects of the present disclosure is depicted. In one embodiment, MEMC 300 includes three legs 301, 303 and 305 respectively. Furthermore, each leg 301, 303 and 305 of the MEMC may include a first string 302 and a second string 304. It should be noted that even though in FIG. 2, certain referral numerals are shown for only one leg 301, they can be equally applicable to other two legs 303 and 305. More particularly, the first string 302 may be operatively coupled to the second string 304 to form the leg 301. Furthermore, the first string 302 may be operatively coupled between a first bus 306 and a second bus 308. In one embodiment, the first bus 306 may include a positive DC bus and the second bus 308 may include a negative DC bus. The second string 304 may be operatively coupled to the first string 302 via a first connecting node 310 and a second connecting node 312. Also, the first string 302 may include a first branch 314 operatively coupled to a second branch 316 via a third connecting node 318. Similarly, the second string 304 may include a first portion 320 operatively coupled to a second portion 322 via an AC phase 326 and an inductor 324. In an embodiment, inductor 324 is a split inductor i.e., inductor 324 is split into two parts. The third connecting node 318 may be operatively coupled to a third bus 328.

In addition, the first leg 301 may be operatively coupled to the second leg 303 via the third connecting node 318.

Furthermore, in one example, the third connecting nodes 318 of each of the three first strings 302 may be operatively coupled to each other to form a third bus 328. As noted hereinabove, the third bus 328 may be a middle or center DC bus. However, in another embodiment, for applications in machine drives, the third connecting nodes 318 of each of the three first strings 302 may be operatively coupled to a neutral bus. Moreover, the three legs 301, 303, 305 may be operatively coupled between the first bus 306 and the second bus 308.

In one embodiment, the third bus 328 may be at a negative potential with respect to the first bus 306 and at a positive potential with respect to the second bus 308. Also, the first string 302 may include a plurality of controllable semiconductor switches 330. In the example of FIG. 2, the plurality of controllable semiconductor switches may include partially controllable semiconductor switches. However, in another embodiment, the plurality of controllable semiconductor switches may include fully controllable semiconductor switches. Moreover, the plurality of controllable semiconductor switches may include a combination of partially controllable semiconductor switches and fully controllable semiconductor switches. By way of a non-limiting example, the first string 302 may include partially controllable semiconductor switches, fully controllable semiconductor switches, or a combination of partially controllable semiconductor switches and fully controllable semiconductor switches. Furthermore, in one example, the first branch 314 of the first string 302 may include two controllable semiconductor switches 330. Similarly, the second branch 316 of the first string 302 may include two controllable semiconductor switches 330. The controllable semiconductor switches 330 may include a power diode 332 in combination with a thyristor 333 or a silicon controlled rectifier, a gate turnoff thyristor, an IGBT, and the like.

The inductors 324 in each leg 301, 303 and 305 are operatively coupled to at least one alternating current (AC) phase (e.g., A, B, and C). In addition, the first portion 320 and the second portion 322 of the second string 304 may include a plurality of switching units 334 connected in series to each other. The switching unit 334 may be a combination of a plurality of fully controllable semiconductor switches and an energy storage device. The fully controllable semiconductor switches may include an insulated gate bipolar transistor (IGBT), a metal oxide semiconductor field effect transistor (MOSFET), a field effect transistor (FET), a gate turn-off thyristor, an insulated gate commutated thyristor (IGCT), an injection enhanced gate transistor (IEGT), a silicon carbide based switch, a gallium nitride based switch, a gallium arsenide based switch, or equivalents thereof.

Figure 3:
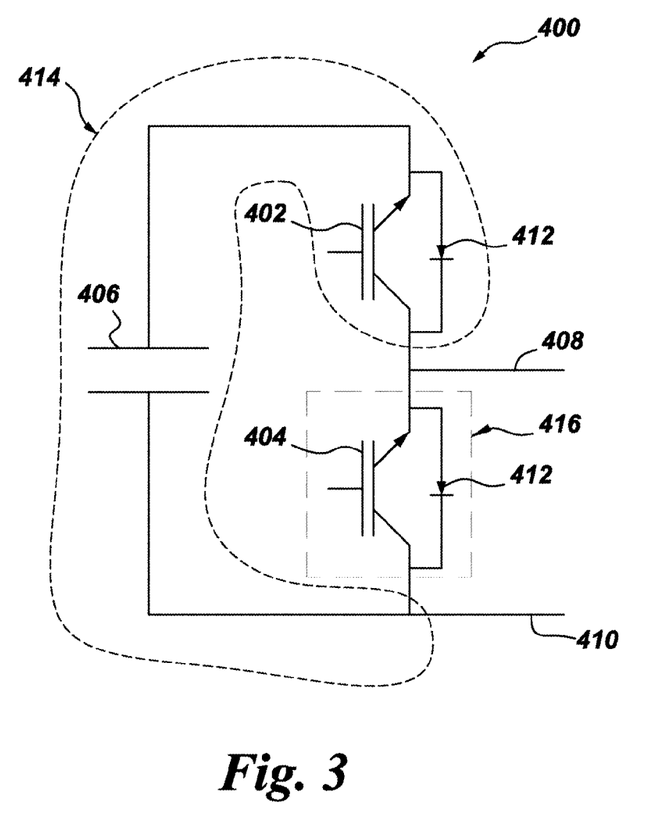
FIG. 3 is a diagrammatical representation of an exemplary embodiment of a switching unit for use in the portion of the power converter of FIG. 2, according to aspects of the present disclosure.

Referring now to FIG. 3, diagrammatical representation 400 of an exemplary embodiment of a switching unit such as the switching unit 334 of FIG. 2 is depicted. In the presently contemplated configuration, the switching unit 400 may include fully controllable semiconductor switches 402 and 404, an energy storage device 406, a first connector 408, and a second connector 410. As previously noted, the fully controllable semiconductor switches 402, 404 may include an IGBT, a MOSFET, a FET, an IEGT, a gate turn-off thyristor, an IGCT, a silicon carbide based switch, a gallium nitride based switch, a gallium arsenide based switch, or equivalents thereof. Moreover, each of the fully controllable semiconductor switches 402, 404, may also include a power diode 412 that may be inbuilt and antiparallel to the fully controllable semiconductor switches 402 and 404. The inbuilt power diodes 412 may provide a freewheeling path. These power diodes 412 may also be referred to as freewheeling diodes.

Also, in one non-limiting example, the energy storage device 406 may include a capacitor. In the example of FIG. 3, the fully controllable semiconductor switch 402 may be operatively coupled in series to the energy storage device 406 to form a first limb 414. Also, the other fully controllable semiconductor switch 404 forms a second limb 416. The second limb 416 may be operatively coupled in parallel to the first limb 414. Additionally, the first limb 414 and the second limb 416 may be operatively coupled between the first connector 408 and the second connector 410. Although the example of FIG. 3 depicts the switching units 400 in a half bridge converter configuration as including two fully controllable semiconductor switches, and one energy storage device, use of other numbers of fully controllable semiconductor switches 402, 404, and energy storage devices 406 is also contemplated. In one embodiment, some or all of the switching units may be arranged to form a full bridge converter configuration.

Furthermore, in one non-limiting example, when the fully controllable semiconductor switch 402 is activated and the fully controllable semiconductor switch 404 is deactivated, the energy storage device 406 may appear across the first connector 408 and the second connector 410. Consequently, the charge across the energy storage device 406 appears as a voltage across the first connector 408 and the second connector 410. Alternatively, when the fully controllable semiconductor switch 404 is activated and the fully controllable semiconductor switch 402 is deactivated, the first limb 414 is bypassed, thereby providing zero voltage across the first connector 408 and the second connector 410. Hence, by controlling the switching of the fully controllable semiconductor switches 402 and 404 in the plurality of switching units 334 on the second string 304 of FIG. 2, the voltage developed across the second string 304 may be regulated.

Figure 4A:
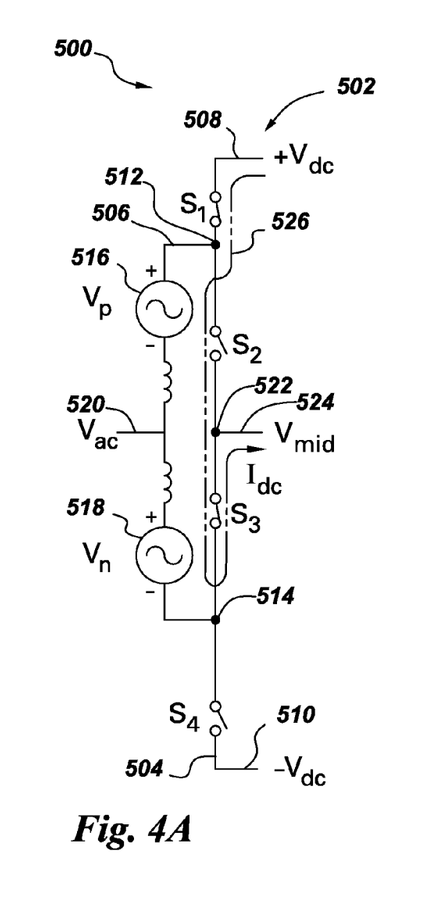
FIGS. 4(a)-4(c) are diagrammatical representations of an exemplary switching pattern of controllable semiconductor switches in the power converter of FIG. 2, according to aspects of the present disclosure.

Referring to FIG. 4(a), a diagrammatical representation of a leg 502, such as the leg 301 of FIG. 2, in a first state of switching of the controllable semiconductor switch is presented. The first state may also be referred to as a positive state. The leg 502 may include a first string 504 and a second string 506. Also, the leg 502 may be operatively coupled between a first bus 508 and a second bus 510. As noted hereinabove, the first bus 508 may include a positive DC bus and the second bus 510 may include a negative DC bus. Furthermore, the first string 504 may be operatively coupled to the second string 506 via a first connecting node 512 and a second connecting node 514. Controllable semiconductor switches 330 (FIG. 2) of first string are all labeled as S1, S2, S3 and S4 respectively.

In addition, a first portion, such as the first portion 320 of FIG. 2 of the second string 506 and a second portion, such as the second portion 322 of FIG. 2 of the second string 506 may be represented by voltage sources $V_p$ 516 and $V_n$ 518, respectively. As noted hereinabove, the second string 506 may include a plurality of switching units (not shown). The first portion of the second string 506 and the second portion of the second string 506 may be operatively coupled via an alternating current phase 520. Also, the first string 504 may include a third connecting node 522, which may be operatively coupled to a third bus 524. Also, in the presently contemplated configuration the first string 504 includes four controllable semiconductor switches represented as $S_1$, $S_2$, $S_3$ and $S_4$. Additionally, the voltage at the first bus 508 may be represented as $+V_{dc}$ and the voltage at the second bus 510 may be represented as $-V_{dc}$. By way of example, the voltage of $+V_{dc}$ at the first bus 508 and the voltage of $-V_{dc}$ at the second bus 510 may be with respect to a virtual ground. Also, the voltage at the third bus 524 may be represented as $V_{mid}$, and the voltage at the alternating current phase may be represented as $V_{ac}$.

As depicted in FIG. 4(a), during the first state of switching, the controllable semiconductor switches $S_1$ and $S_3$ are activated, while the controllable semiconductor switches $S_2$ and $S_4$ are maintained in a deactivated state. The activation of controllable semiconductor switches $S_1$ and $S_3$ provides a first current flow path 526 between the first bus 508 and the third bus 524 via a corresponding second string 506. Consequently, the second string 506 may be operatively coupled between the first bus 508 and the third bus 524 in the positive state. Furthermore, while the first current flow path 526 is established, the voltage across the first bus 508 and the third bus 524 may depend on the switching of the fully controllable semiconductor switches corresponding to the plurality of switching units in the second string 506, such as the switching units 334 of FIG. 2. The current flowing through the first current flow path 526 is represented as $I_{dc}$.

Figure 4B:
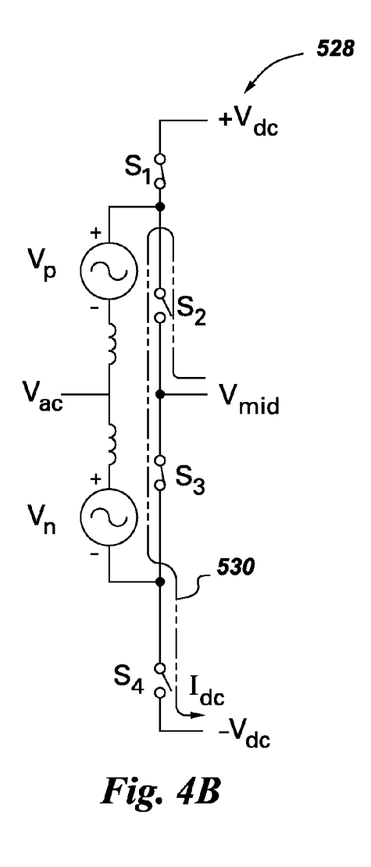

In a similar fashion, FIG. 4(b) is a diagrammatical representation 528 of a leg in a second state of switching of the controllable semiconductor switches. The second state of switching of the controllable semiconductor switches may also be referred to as a negative state. For ease of understanding, FIG. 4(b) is explained with reference to FIG. 4(a). In the second state, the controllable semiconductor switches $S_2$ and $S_4$ may be activated, while controllable semiconductor switches $S_1$ and $S_3$ are deactivated. The activation of the controllable semiconductor switches $S_2$ and $S_4$ may result in providing a second current flow path 530 between the third bus 524 and the second bus 510. Accordingly, the second string 506 may be operatively coupled between the second bus 510 and the third bus 524 in the negative state.

Figure 4C:
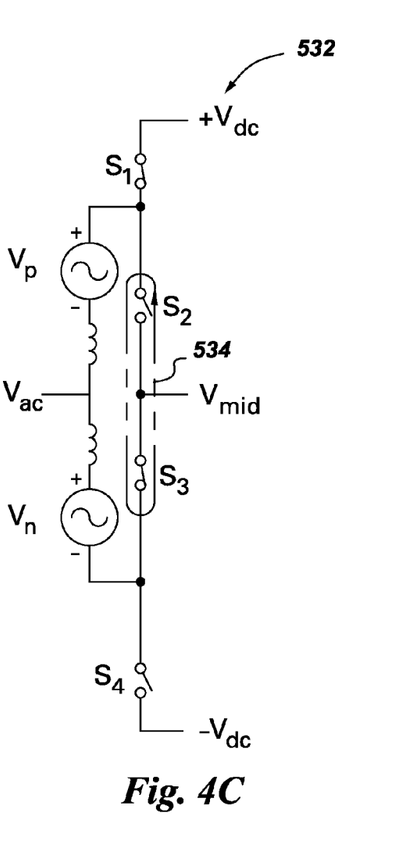

Similarly, FIG. 4(c) is a diagrammatical representation 532 of a leg in a third state of switching of the controllable semiconductor switches. The third state of switching of the controllable semiconductor switches may also be referred to as a zero state. For ease of understanding, FIG. 4(c) is explained with reference to FIG. 4(a). Furthermore, in the third state, the controllable semiconductor switches $S_2$ and $S_3$ may be activated, while the controllable semiconductor switches $S_1$, and $S_4$ are deactivated. The activation of the controllable semiconductor switches $S_2$ and $S_3$ may result in providing a third current flow path 534. Subsequently, the current flows in the third current flow path 534. This third current flow path 534 may also be referred to as a freewheeling path. In addition, both ends of the second string 506 may be operatively coupled to each other via the activated controllable semiconductor switches $S_2$ and $S_3$ and the third bus 524. Although, FIGS. 4(a)-4(c) represent the three states of switching with reference to a single leg, these three states of switching may be employed simultaneously for a plurality of legs in a two phase power converter, a three phase power converter, and the like.

It should be noted that any power converter system needs a grounding point to reduce the insulation level requirement. For example, for a conventional modular multilevel converter, additional passive components are needed to create a grounding point either at alternating current (AC) or direct current (DC) side and these passive components need to be rated for the full system voltage. In accordance with an embodiment of the present technique, a grounding scheme for a MEMC is disclosed.

Figure 5:
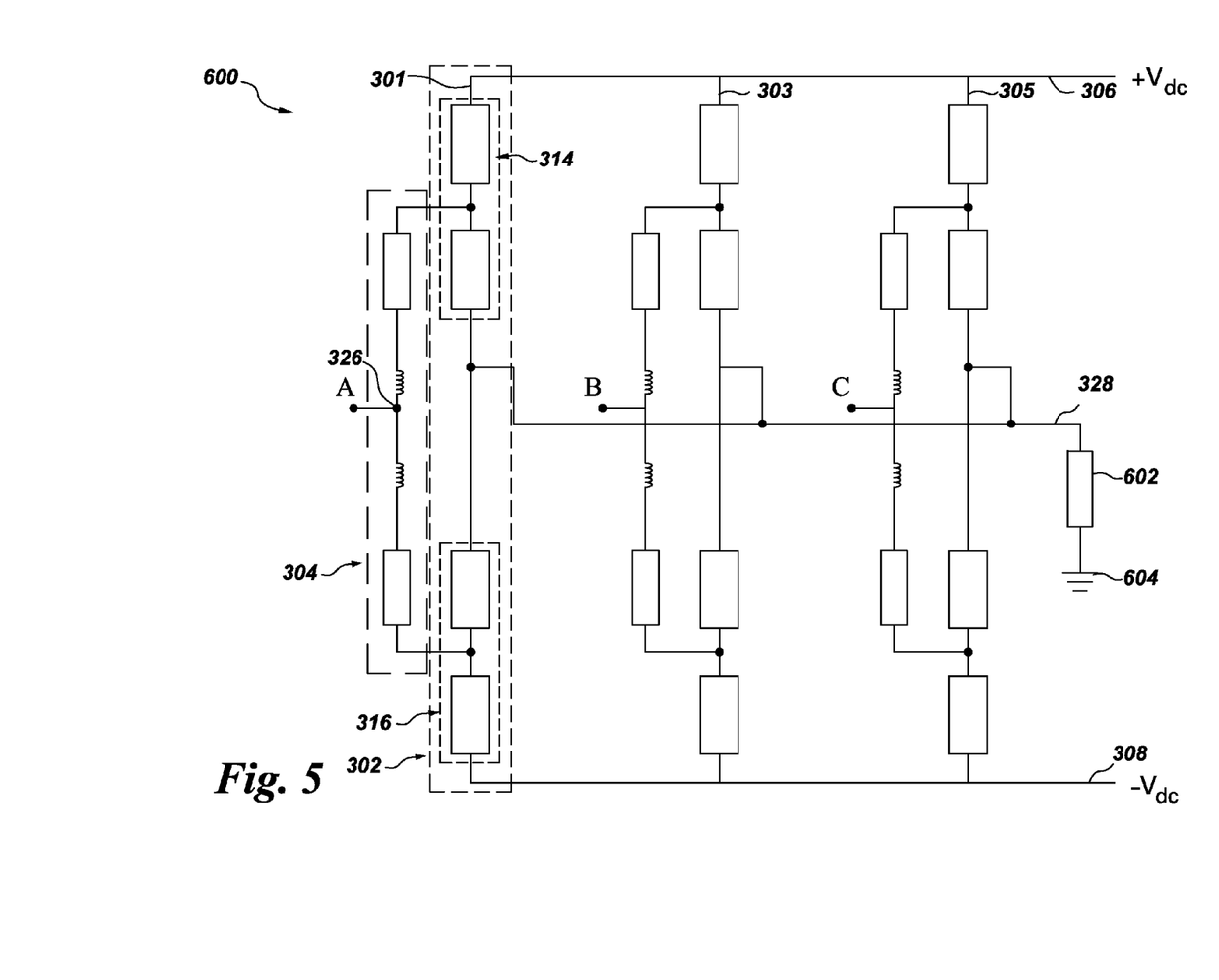
FIG. 5 is a diagrammatical representation of an exemplary embodiment of a grounding scheme for a modular embedded multilevel converter (MEMC) of FIG. 2, according to aspects of the present disclosure.

Referring to FIG. 5, a diagrammatical representation 600 of an exemplary embodiment of a grounding scheme for a MEMC of FIG. 2, according to aspects of the present disclosure, is depicted. In the example of FIG. 5, the MEMC 600 includes three legs 301, 303, 305. As in FIG. 2, each leg may include a respective first and second string 302 and 304. Furthermore, the first string 302 includes the first branch 314 and the second branch 316.

The mid-point 326 of the second string 304 may be operatively coupled to a fourth bus which may be an alternating current (AC) phase. In particular, each of the three legs 301, 303, 305 may be associated with at least one AC phase. In a non-limiting example, a three phase AC system may include an AC phase-A, an AC phase-B, and an AC phase-C. Additionally, a first terminal (not shown) may be formed by a combination of the first bus 306 and the second bus 308. The first terminal may also be referred to as a DC terminal. Also, the AC phases, AC phase-A, AC phase-B, and AC phase-C in combination may form a second terminal (not shown). The second terminal may also be referred to as an AC terminal.

In addition, the first leg 301 may be operatively coupled to the second leg 303 via the third connecting node 318. In one embodiment, the third connecting node 318 may be the mid-point node or center point node of the first string 302. Furthermore, in one example, the third connecting nodes 318 of each of the three first strings 302 may be operatively coupled to each other to form the third bus 328. In one embodiment the third bus 328 is connected to an earth or ground connection 604 via grounding impedance 602. This results in each of the third connecting nodes 318 being connected to ground connection 604 via grounding impedance 602. The design of grounding impedance 602 depends on various parameters such as but not limited to an allowable ground current, soil conditions, and radio interference with surrounding instruments or even voltage across MEMC 600.

The design of grounding impedance 602 affects voltage insulation ratings of various components of MEMC 600. To achieve different design criteria, the impedance of the grounding network may have different impedance values at different system frequencies. In one embodiment, a value of the grounding impedance 602 may be about zero ohms for dc current and very high impedance for high frequency currents, i.e., there may an inductive grounding impedance between the third bus 328 and the ground connection 604. In another embodiment, the third bus 328 may be connected to the ground connection 604 directly, i.e., without any grounding impedance. In such a case, the third bus 328 is always at near zero voltage, which results in easy design of voltage blocking levels for first branch 314 and second branch 316.

As depicted in FIG. 4 at any instant in time, the second string 304 is operatively coupled between the first bus 306 and third bus 328, between the third bus 328 and the second bus 308, or both ends of the second string 304 may be operatively coupled to a third bus 328. Now as shown in FIG. 5, if the third bus 328 is connected to ground connection 604, the second string 304 may have to withstand a maximum voltage of value Vdc assuming a voltage across first bus 206 and third bus 328 to be equal to Vdc. Accordingly, for effective control of the power converter, the first portion of the second string 304 and the second portion of the second string 304 may each have to withstand a maximum voltage of $V_{dc}$. Accordingly, the rating of each switching unit of the second string 304 may be only Vdc/N1, where $N_1$ is the number of switching units in each of the first and second portions of the second string 304. Hence, the rating of each switching unit may be $2V_{dc}/N$, where N is the number of switching units in the second string 304 and N=2N1. Furthermore, controllable semiconductor switches 330 in first string 302 may each be rated at Vdc/2.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power converter, comprising:
at least two legs, each leg comprising:
a first string comprising a plurality of controllable semiconductor switches, a first connecting node, and a second connecting node, wherein the first string is operatively coupled across a first bus and a second bus;
a second string operatively coupled to the first string via the first connecting node and the second connecting node, wherein the second string comprises a plurality of switching units;
wherein the first string comprises a first branch and a second branch, and wherein the second branch is operatively coupled to the first branch via a third connecting node;
wherein the third connecting node is coupled to a ground connection; and
wherein the third connecting nodes of the at least two legs are directly connected to each other.

2. The power converter of claim 1, wherein the third connecting node of the first string is coupled to the ground connection via grounding impedance.

3. The power converter of claim 2, wherein a value of the grounding impedance depends on system frequency.

4. The power converter of claim 2, wherein a design of grounding impedance is based on a plurality of parameters including an allowable ground current, soil conditions, and radio interference with surrounding instruments and a voltage across the power converter.

5. The power converter of claim 1, wherein a voltage rating of each switching unit of the second string is Vdc/N1, where Vdc is a direct current (DC) voltage across the first bus and the ground connection and $N_1$ is a number of switching units in each half of the second string.

6. The power converter of claim 1, wherein, a voltage rating of controllable semiconductor switches in the first string is about Vdc/2, where Vdc is a direct current (DC) voltage across the first bus and the ground connection.

7. The power converter of claim 1, wherein each of the plurality of switching units comprises a plurality of fully controllable semiconductor switches and at least one energy storage device.

8. The power converter of claim 1, wherein the first bus comprises a positive direct current bus and the second bus comprises a negative direct current bus.

9. The power converter of claim 1, wherein the second string comprises a first portion and a second portion.

10. The power converter of claim 9, wherein the plurality of switching units in the first and second portions of the second string are operatively coupled to each other via at least one inductor and a fourth node.

11. The power converter of claim 10, wherein the fourth node comprises an alternating current phase.

12. The power converter of claim 1, wherein the plurality of controllable semiconductor switches comprises partially controllable semiconductor switches, fully controllable semiconductor switches, or a combination thereof.

13. A system for power conversion, comprising:
a power source;
a load;
a first power converter, comprising:
at least two legs, wherein each of the at least legs comprises:
a first string comprising a plurality of controllable semiconductor switches, a first connecting node, and a second connecting node, wherein the first string is operatively coupled across a first bus and a second bus;
a second string operatively coupled to the first string via the first connecting node and the second connecting node, wherein the second string comprises a plurality of switching units;
wherein the first string comprises a first branch and a second branch, and wherein the second branch is operatively coupled to the first branch via a third connecting node;
wherein the third connecting node is coupled to a ground connection;
wherein the third connecting nodes of the at least two legs are directly connected to each other; and
a controller configured to control switching of the plurality of controllable semiconductor switches and the plurality of switching units.

14. The system of claim 13, wherein the load comprises a grid, an electrical appliance, or a combination thereof.

15. The system of claim 13, wherein the third connecting node of the first string is coupled to the ground connection via grounding impedance.

16. The system of claim 15, wherein a design of grounding impedance is based on a plurality of parameters including an allowable ground current, soil conditions, and radio interference with surrounding instruments and a voltage across the power converter.

17. The system of claim 13, wherein a voltage rating of each switching unit of the second string is Vdc/N1, where Vdc is a direct current (DC) voltage across the first bus and the ground connection and $N_1$ is a number of switching units in each half of the second string.

18. The system of claim 13, wherein, a voltage rating of controllable semiconductor switches in the first string is about Vdc/2 where Vdc is a direct current (DC) voltage across the first bus and the ground connection.

19. The system of claim 13, wherein the plurality of switching units comprises a plurality of fully controllable semiconductor switches and at least one energy storage device.

20. The system of claim 13, wherein the plurality of controllable semiconductor switches comprises partially controllable semiconductor switches, fully controllable semiconductor switches, or a combination thereof.

* * * * *